May 22, 1951  J. R. OWEN  2,554,054
PROCESS FOR PRODUCING BUTADIENE
Filed Jan. 4, 1949  3 Sheets-Sheet 2

INVENTOR.
J. R. OWEN
BY
Hudson & Young
ATTORNEYS

Patented May 22, 1951

2,554,054

UNITED STATES PATENT OFFICE 2,554,054

PROCESS FOR PRODUCING BUTADIENE

James R. Owen, Bartlesville, Okla., assignor to Phillips Petroleum Company, a corporation of Delaware Application January 4, 1949, Serial No. 69,165

9 Claims. (Cl. 260—680)

This invention relates to the production of 1,3-butadiene. In some of its preferred embodiments the invention relates to the production of butadiene by the catalytic dehydrogenation of normal butane followed by the catalytic dehydrogenation of the resulting butenes. Certain specific aspects of the invention pertain to improvements in the treatment of normal butenes to provide increased yields of butadiene and improved efficiency of catalyst.

During the past several years the production of 1,3-butadiene has become of great commercial importance. While the bulk of the butadiene is employed as a copolymer in the production of synthetic rubbers, the compound is also a chemical intermediate. Butadiene has been produced successfully from alcohols and other organic chemicals, but by far the most important sources have been the four-carbon-atom hydrocarbons. Where an adequate supply of normal butenes is available, they are catalytically dehydrogenated to produce butadiene. Since butenes have many other uses, an important commercial procedure is to dehydrogenate normal butane catalytically to form mixed normal butenes which are then catalytically dehydrogenated to produce the desired butadiene.

The obtaining of maximum yields of butadiene from a given weight of raw material butane or butene has received a very large amount of attention, and particular emphasis has been placed on dehydrogenation catalyst compositions and dehydrogenation conditions in general, as well as on the methods employed for purifying the butadiene product and the intermediate reaction products. It is extremely important, of course, to provide catalyst and conditions which will give a long period of use for a given charge of catalyst before it must be replaced with new catalyst. Not only the dehydrogenation conditions but also the conditions employed when the catalyst is regenerated by burning carbonaceous deposits therefrom with steam or an oxygen-containing gas has considerable effect on ultimate life. It is also important to avoid side reactions as much as possible so that high ultimate yields of butadiene from feed materials are obtained at reasonable per-pass yield levels.

It is an object of this invention to produce butadiene (1,3-butadiene).

Another object of the invention is to produce butadiene by catalytic dehydrogenation by normal butenes.

A further object of the invention is to increase the yield of butadiene obtainable by the catalytic dehydrogenation of normal butenes.

Yet another object of the invention is to provide an improved method for converting normal butane to butadiene.

Another object of the invention is to increase the yield of butadiene without altering the temperatures employed in catalytically dehydrogenating normal butenes.

A still further object of the invention is to accomplish butene dehydrogenation at optimum conditions.

A further object is to avoid excessive temperatures in butene dehydrogenation through isomerization of butenes in conjunction with dehydrogenation of same.

Another object of the invention is to employ dehydrogenation catalysts in such a way as to maintain maximum butadiene production therefrom.

Further objects and advantages of the invention will be apparent, to one skilled in the art, from the accompanying disclosure and discussion.

In accordance with a preferred embodiment of my invention, the foregoing objects are accomplished by dehydrogenating normal butane to produce a mixture of normal butenes, i. e. 1-butene, trans-2-butene, and cis-2-butene, or a mixture of said normal butenes is obtained from any other suitable source such as refinery gases obtained from pyrolysis of heavy and/or light petroleum materials. In contra-distinction to the conventional procedure whereby the mixed butenes are subjected to catalytic dehydrogenation to produce butadiene, I effect a segregation of each of the three different normal butenes one from the other and subject each of the resulting concentrated or relative pure individual butene isomers to separate catalytic dehydrogenation at conventional dehydrogenation temperatures whereby both the per-pass yield and the ultimate yield of butadiene is very greatly increased. The amount of dehydrogenation occurring in a given reactor is controlled by both the kinetics and the thermodynamics of the reaction. Among other things, my invention obtains enhanced yields of butadiene by raising the so-called thermodynamic ceiling of the dehydrogenation reaction. With a higher ceiling, a greater conversion at any given set of operating conditions is obtained. The equilibrium conversion, or thermodynamic ceiling, of each individual butene isomer to butadiene is considerably higher than the equilibrium conversion of mixed butenes. It is therefore possible, as will be brought out herein below, to produce more butadiene by the practice of my invention than has heretofore been accomplished.

The foregoing and various other features of my invention in its preferred embodiments will be observed in greater detail from a consideration of the accompanying drawings and discussion thereof. The drawings are schematic flow diagrams representing various embodiments of my invention.

Figure 4:
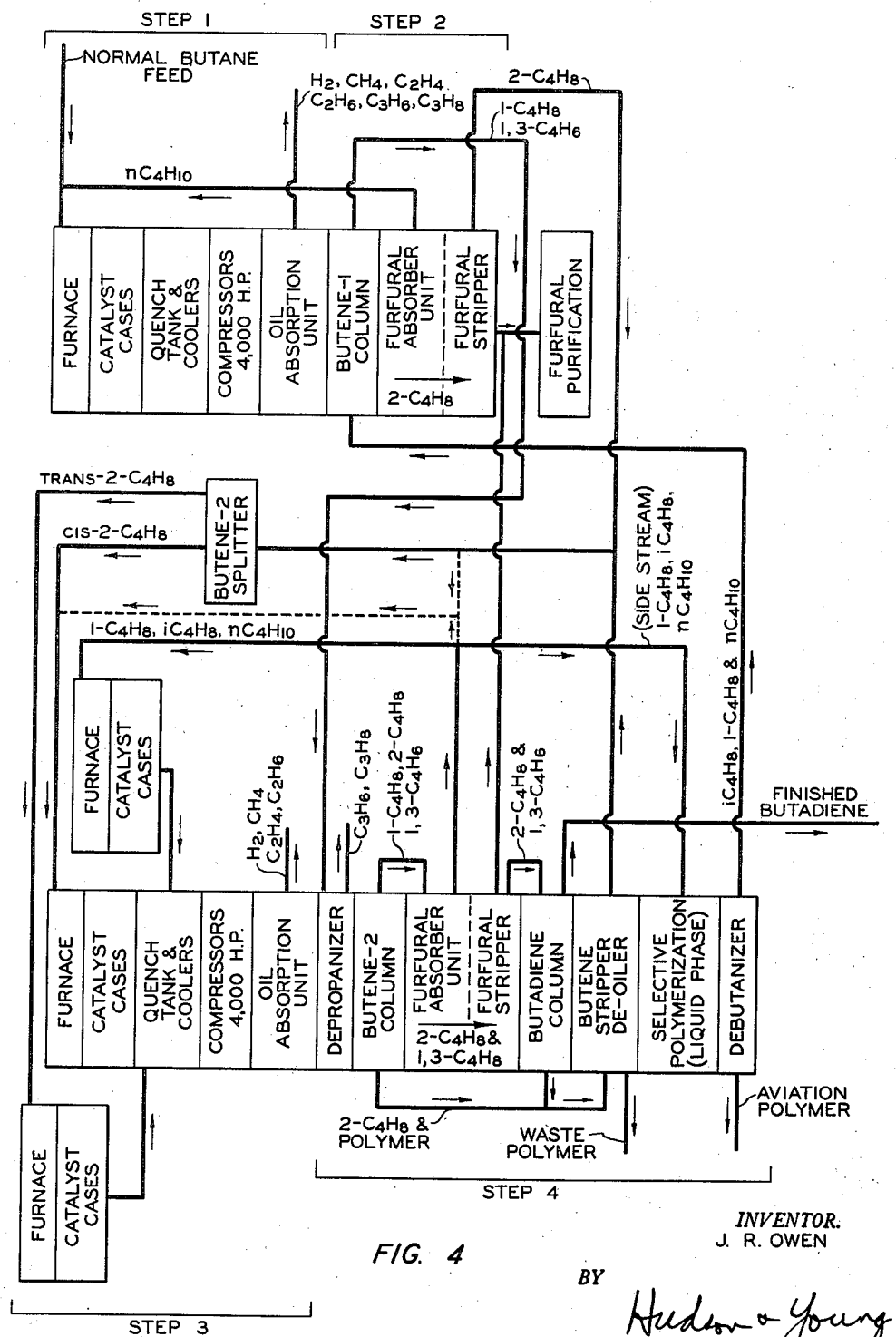

Figure 4 constitutes a diagrammatic illustration of a particular method for combining certain dehydrogenation and separation steps to obtain increased butadiene yields.

Inasmuch as those skilled in the art are fully familiar with the construction of catalyst cases, fractionation columns, extraction towers, and the use of the numerous auxiliary items of equipment such as blowers, pumps, valves, heat exchangers, control instruments and the like, details of these elements have not been shown in the drawings. One skilled in the art upon reading the present disclosure will readily be able to supply same as required.

Figure 1:
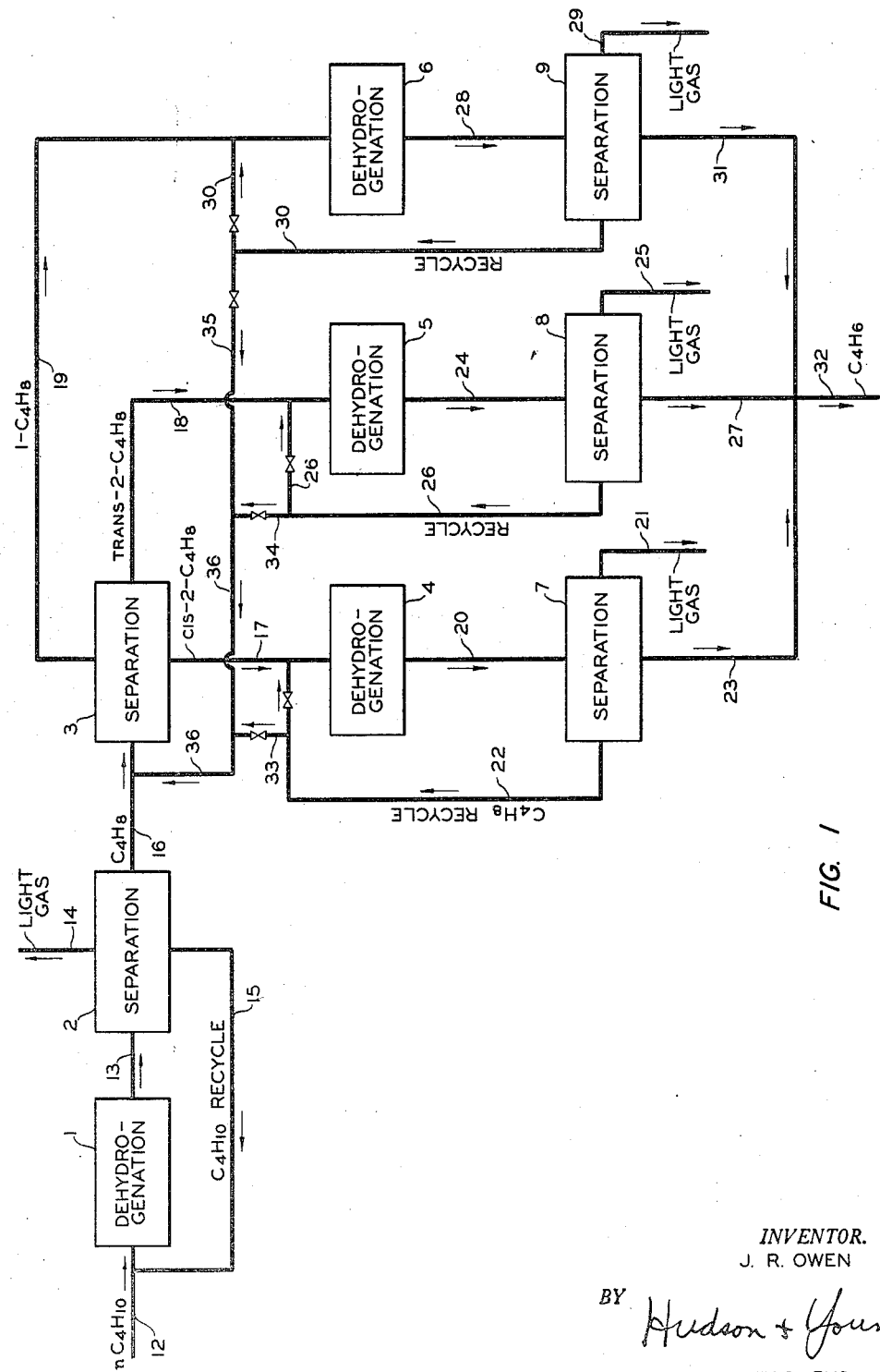
Figure 1 shows one procedure whereby normal butane is converted to butadiene.

In the embodiment shown in Figure 1, normal butane, obtained from natural gas or gasoline or from any other suitable source, is passed to dehydrogenation zone 1 via line 12. In zone 1 the normal butane is catalytically converted to mixed butenes by dehydrogenation. A catalyst comprising alumina and chromia, together with small amounts of beryllia or magnesia, is preferred. However, any of the many paraffin dehydrogenation catalysts known in the art may be used. While the precise conditions employed will depend upon the particular catalyst used, its activity, and various other factors, gas space velocity of 500 to 1500 volumes butane per volume of catalyst per hour, temperatures of 1000 to 1200° F., and approximately atmospheric pressure, are generally suitable.

The effluent is quenched by means not shown and passed via line 13 to separation zone 2, which may comprise several conventional separation steps such as gas flashing, oil absorption, fractional distillation, extractive distillation, solvent extraction, and the like. A light gas fraction comprising hydrogen produced by the dehydrogenation and small amounts of paraffins and olefins lower boiling than the 4-carbon-atom hydrocarbons is withdrawn from the system through line 14. Unconverted normal butane is recovered and recycled via line 15 to dehydrogenation zone 1. Small amounts of $C_5$ and heavier material are discarded from zone 2 by means not shown, or are separated and recovered in separation zone 3 described below.

A mixture of normal butenes is passed via line 16 to separation zone 3, which may comprise several fractional distillation and/or extractive distillation, or other separation steps. The recovery of normal butane for recycle may be made in this series of steps rather than in a first zone 2 if desired. In zone 3 or elsewhere in the system, small amounts of isobutylene formed by isomerization of normal butenes in dehydrogenation zone 1 may be separated from the system to avoid a building-up of the concentration of same. A fraction comprising chiefly cis-2-butene is passed via line 17 to dehydrogenation zone 4. A fraction comprising chiefly trans-2-butene is passed via line 18 to dehydrogenation zone 5. A fraction comprising chiefly butene-1 is passed via line 19 to dehydrogenation zone 6. The catalyst used in dehydrogenation zones 4, 5, and 6 is preferably one comprising about 93 per cent $Fe_2O_3$, 5 per cent $Cr_2O_3$ and 2 per cent $K_2O$, and steam is employed as diluent for the butenes undergoing dehydrogenation; however other known olefin dehydrogenation catalysts may be used with or without steam diluent as desired. Different catalysts may be used in the three zones. In such a case, I prefer to have the most active catalyst in zone 5, since trans-2-butene is the most resistant of the three normal butenes to dehydrogenation.

Pressure maintained in zones 4, 5, and 6 is preferably atmospheric or sub-atmospheric. It is often desirable to dilute the respective individual butenes entering zones 4, 5 and 6 with steam to decrease the partial pressure of the butene and of the butadiene formed. In this instance a steam-active catalyst, such as that described above, is employed. Ten or more volumes steam per volume butene are ordinarily used with this particular catalyst. Temperatures of 1050 to 1250° F. are preferred for zones 4 and 6, whereas temperatures of 1150 to 1350° F. are preferred for zone 5, particularly when the same type of catalyst is used in all three zones.

The effluent of zone 4 is quenched by means not shown and passed via line 20 to a separation system shown diagrammatically as zone 7. From this zone a light gas fraction comprising hydrogen and small amounts of hydrocarbons lighter than $C_4$ is withdrawn from the system through line 21. Unconverted butene is recovered and recycled via line 22 to zone 4 for further dehydrogenation. Butadiene product is recovered through line 23. Similarly, the effluent of zone 5 is passed via line 24 to separation zone 8, from which light gases are removed through line 25, butene is recovered and recycled through line 26, and butadiene is recovered through line 27. In like manner, effluent from the butene-1 dehydrogenation zone 6 is passed via line 28 to separation zone 9, from which a light gas fraction is recovered through line 29, unconverted butene is recovered and recycled through line 30 to dehydrogenation zone 6 for further formation of butadiene therein, and butadiene is recovered through line 31. The butadiene separated in zones 7, 8 and 9 may be combined and withdrawn from the system through line 32 as the principal product of the process.

An important feature of the embodiment of my invention shown in Figure 1 involves the splitting of each of the recycle butene streams 22, 26 and 30 into two portions. One portion of each stream is passed via line 33, 34, or 35, respectively, into line 36 and thence returned to separation zone 3. I have found that even though practically pure individual butene isomers are passed into the separate dehydrogenation zones 4, 5 and 6, conditions therein are such that the particular butene isomer fed thereto which is not converted into butadiene undergoes a limited amount of isomerization to the other isomers.

Accordingly, by diverting a portion of the recovered unreacted butenes to separation zone 3 rather than returning the entire stream to its own dehydrogenation zone, I am able to effect a separation in zone 3 of the various isomers so produced, and in this way maintain a high concentration of each individual isomer in the feed to the individual dehydrogenation zones. If all of the butene streams 22, 26 and 30 recovered from the effluent of the respective dehydrogenation zones were passed to separation zone 3, the latter would be overloaded unnecessarily, whereas by my method of operating I take advantage of the fact that a large portion of the butene separated from effluent of dehydrogenation zone 4 is still cis-2-butene, a large portion of that separated from dehydrogenation zone 5 is trans-2-butene, and a large portion of that separated from dehydrogenation zone 6 is 1-butene. Usually at least half, and preferably much more than half, of each of these separate streams is recycled to its respective dehydrogenation zone, and only a minor portion is passed to separation zone 3.

Figure 2:
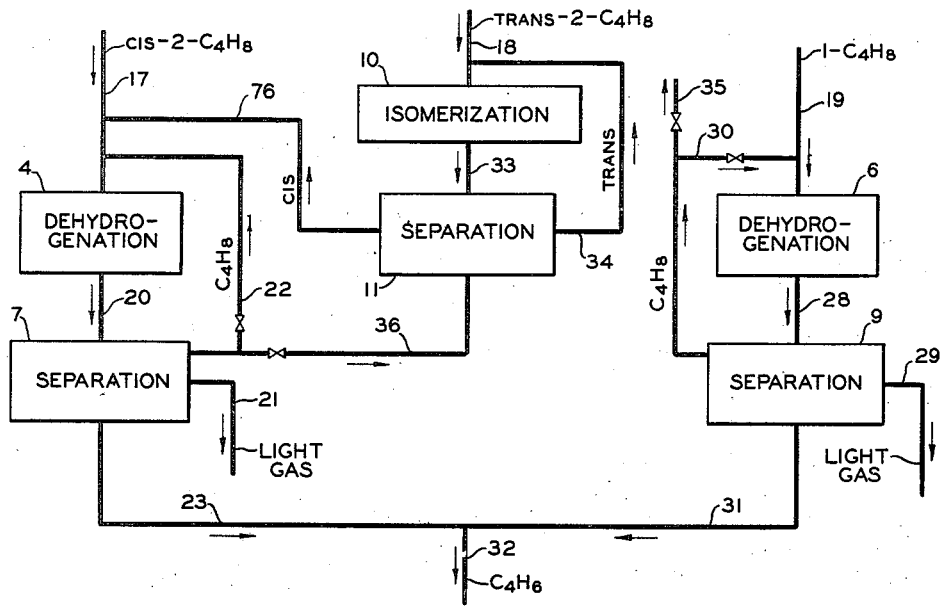
Figure 2 illustrates a method for converting butenes, which may be obtained by dehydrogenation of butane or otherwise, into butadiene, wherein an isomerization of trans-2-butene is employed in conjunction with dehydrogenation and separation steps.

Figure 2 may be taken in conjunction with Figure 1, and shows a different modification for individually processing cis-2-butene, trans-2-butene, and 1-butene which are present in lines 17, 18 and 19 respectively, having been separated one from the other in separation zone 3, or otherwise. Cis-2-butene is passed through dehydrogenation zone 4 and separation zone 7 as previously described in connection with Figure 1. Butene-1 is passed through dehydrogenation zone 6 and separation zone 9 as previously described in conjunction with Figure 1. Unreacted butene recovered from zone 9 is recycled to dehydrogenation zone 6 through line 30, and a portion may be withdrawn through line 35 and returned to separation zone 3 as shown in Figure 1 if desired.

Trans-2-butene is passed from line 18 to isomerization zone 10 and is isomerized therein to cis-2-butene in the presence of a suitable catalyst such as calcined bauxite or brucite. The desirable temperature range with these catalysts is from 100 to 800° F. Pressure is preferably near atmospheric, although either higher or lower pressures may be used. Pressure has little effect on the reaction itself, the main consideration being to maintain a pressure below a value which would cause olefin polymerization to an appreciable or undesirable extent. Space velocities of the order of 1 to 10 volumes of liquid feed per volume of catalyst per hour are suitable for isomerization zone 10.

The effluent from zone 10 is passed via line 33 to a separation zone 11 in which cis-2-butene formed by isomerization in zone 10 is separated from unisomerized trans-2-butene. The latter may be recycled via line 34 to further isomerization in zone 10. The cis-2-butene recovered is passed via line 76 to dehydrogenation zone 4 in admixture with that present in lines 17 and 22. A portion of the butene effluent from separation zone 7 which has passed through dehydrogenation zone 4 in the undehydrogenated condition is preferably separated from line 22 and passed via line 36 to separation zone 11 for further resolution into the two isomers if desired. Alternatively or additionally, a portion thereof is passed by means not shown to separation zone 3 for segregation of the isomers one from the other, including the small amount of 1-butene which will have been formed by incidental isomerization in dehydrogenation zone 4.

It will be understood, of course, that in the embodiments described hereinabove as shown both in Figures 1 and 2, suitable means are provided for regenerating the dehydrogenation catalyst, and the isomerization catalyst in zones 10, whenever necessitated by deposition of carbonaceous material thereon. By utilizing a suitable steam active catalyst and adequate quantities of steam diluent in the dehydrogenation zones, an essentially continuous dehydrogenation of indefinite duration may be realized since the steam acts to maintain the catalyst in an active condition probably by water gas reaction with carbonaceous deposits.

Figure 3:
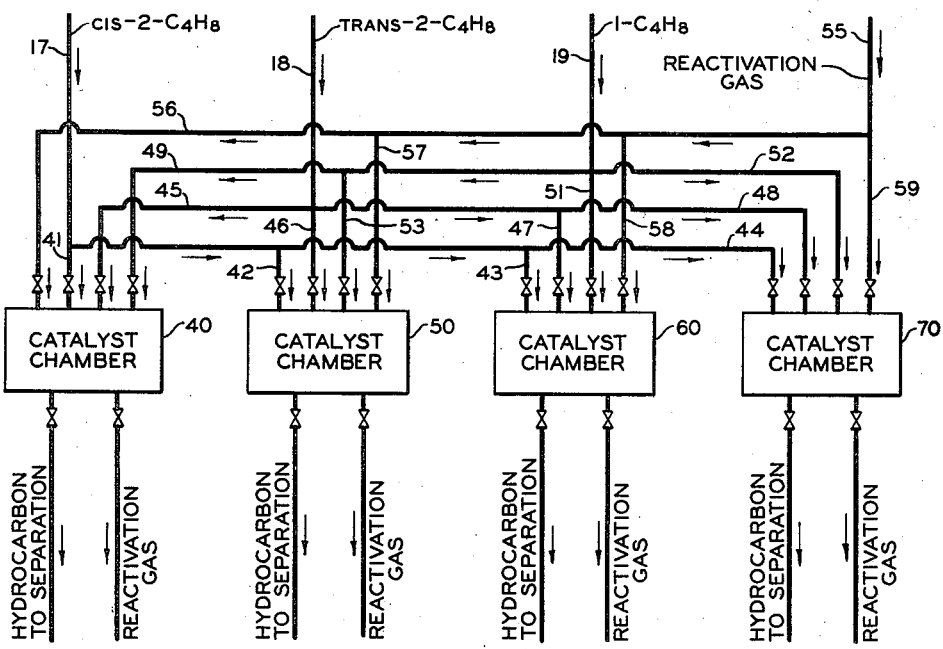
Figure 3 illustrates the use of a plurality of catalyst chambers which are employed for dehydrogenation of different butene isomers in different stages of the process and which also undergo periodic regeneration treatment.

The embodiment of my invention shown in Figure 3 is particularly applicable when employing a dehydrogenation catalyst which must be reactivated fairly often, although a steam active catalyst which remains catalytically active for long periods of time and needs regeneration with less frequency may also be used in this embodiment. In the process of Figure 3 efficient use is made of the initially high activity of the fresh (by which I mean new or freshly reactivated) catalyst. Trans-2-butene is first contacted with the new or reactivated catalyst and such contact is continued until the activity has declined to such a point that the conversion of the trans-2-butene to butadiene has fallen to a predetermined level, for example about 20 to 40 per cent per pass. The partially spent catalyst is then used to dehydrogenate cis-2-butene and/or 1-butene, individually. When the catalytic activity has fallen to a predetermined level for this or these reactions, the catalyst is then regenerated.

As shown in Figure 3, at least four catalyst cases may be employed, each preferably containing the same kind of catalyst. Trans-2-butene, cis-2-butene, and 1-butene are carried to the catalyst chambers from their respective lines 18, 17 and 19 respectively, having been separated one from the other in separation zone 3 as shown in Figure 1, or otherwise. Line 17 is connected with catalyst chambers 40, 50, 60 and 70 by means of valved lines 41, 42, 43 and 44 respectively. Similarly line 18 is connected with the same catalyst chambers by means of valved lines 45, 46, 47 and 48, respectively. In like manner line 19 is connected with the catalyst chambers by means of valved lines 49, 50, 51 and 52, respectively. Reactivation fluid, such as steam or other to be described hereinbelow, is drawn from any suitable source (not shown) through line 55, which in turn is connected with the respective catalyst chambers by valved lines 56, 57, 58 and 59. Each catalyst chamber is equipped with two valved outlet lines or the equivalent, as shown; one for carrying the hydrocarbon dehydrogenation effluent to separation steps as described in connection with the other figures, and the other for carrying effluent spent reactivation gas to the stack or other use or disposal.

The process of Figure 3 is operated continuously, with three of the catalyst chambers on stream for separate catalytic dehydrogenation of the individual butene isomers while the fourth catalyst chamber is undergoing reactivation or is being maintained on a stand-by basis after reactivation for placing in dehydrogenation service at the proper time. The flow is periodically switched in such a manner that the most active catalyst, i. e. fresh catalyst, is employed for dehydrogenating the trans-2-butene, while catalyst which has been used for this purpose and is less active is employed for dehydrogenating the cis- 2-butene and the 1-butene. Catalyst which has been used for one of the two last-mentioned dehydrogenations and is least active is subjected to reactivation. For example, when catalyst chamber 40 has been reactivated, the necessary valves are opened and closed in the various lines so that trans-2-butene, preheated to dehydrogenation temperature by means not shown, is passed to catalyst chamber 40 for catalytic dehydrogenation therein. Simultaneously cis-2-butene flows through catalyst chamber 60 and 1-butene flows through catalyst chamber 70, or vice-versa. Reactivation gas flows from line 55 through catalyst chamber 50 to reactivate the catalyst therein. When the activity in chamber 40 has fallen to a predetermined level, the flow of materials is switched so that the trans-2-butene is then passed into catalyst chamber 50, which has been freshly reactivated. Catalyst chamber 40 is now used for dehydrogenating cis-2-butene, the 1-butene continues to be dehydrogenated in catalyst chamber 70, and catalyst chamber 60 is placed on-stream for reactivation. After this reactivation is completed and the activity of catalyst in chamber 50 has declined to a predetermined quantity, the flow of materials is again switched, with trans-2-butene now being dehydrogenated in catalyst chamber 60 which again contains the most active catalyst. The flow of 1-butene is switched to catalyst chamber 50 which has just been taken off stream for trans-2-butene dehydrogenation, and catalyst chamber 70 is now subjected to reactivation. This general order of switching catalyst chambers is continued, the trans-2-butene being dehydrogenated in each instance by contact with the catalyst having the highest activity at any given time. After a catalyst chamber has been employed for dehydrogenating trans-2-butene, it may be used next for dehydrogenating either cis-2-butene or 1-butene, since these two butenes are about equally susceptible to dehydrogenation.

By operating in the foregoing manner, it is possible to carry out dehydrogenation in each chamber at approximately the same temperature, since the trans-2-butene which is most resistant to dehydrogenation is in contact at all times with the most active catalyst in the group. This avoids the necessity of dehydrogenating the trans-2-butene at excessively high temperatures with consequent increase in side reactions and decrease in ultimate yields. On the other hand, it permits dehydrogenation of the cis-2-butene and the 1-butene with a catalyst which has already had its initial high activity removed by use of the trans-2-butene dehydrogenation, so that excessive cracking, polymerization and other side reactions often encountered with a too active catalyst is obviated. Each body of catalyst also is employed for a maximum length of time before reactivation of same is required.

Where steam-active catalyst, such as the iron oxide catalyst containing small amounts of chromium oxide and potassium oxide described above, are used, with large quantities of steam diluent, deactivation is quite slow, so that the period of time permitted between switching of flow is in each case much longer than when using other types of catalyst having rapid deactivation characteristics. The steam-active catalyst in effect is undergoing continuous reactivation by action of the steam thereon. However the catalyst does lose activity slowly, and this activity is replenished by either or both of two treatments. Flow of hydrocarbons may be stopped so that the catalyst is treated with steam only. This treatment is continued until the activity of the catalyst is increased the desired amount, generally by removal of small amounts of residual carbonaceous material which are held tenaciously by the catalyst. If desired limited amounts of free oxygen can also be passed in contact with the catalyst for reactivation of same, but this is seldom necessary. The second treatment comprises passage of potassium carbonate or other potassium compound convertible to the oxide into the body of catalyst, which results in an increased catalytic activity presumably by replenishing the small amounts of potassia which are carried out of the catalyst by volatilization in normal use. By controlling the frequency of reactivation by steam alone, or the quantity of potassium compound introduced to the catalyst, the catalytic activity of the catalyst is readily adjusted to the high level required for the trans-2-butene dehydrogenation, or if desired to the lower level if used for dehydrogenating the other two normal butene isomers. In case a chromia-alumina catalyst or other catalyst which undergoes rapid deactivation is used for the butene dehydrogenation, the switching of flow will be more frequent, and reactivation will generally be by treatment with free oxygen, usually air diluted with steam or flue-gas to give a low oxygen content reactivation gas. Suitable conditions for these various reactivation treatments are well known to those skilled in the art.

Figure 4 is a self-explanatory schematic flow diagram of a complete plant for converting normal butane to butadiene. In this plant normal butane is catalytically dehydrogenated, and the butenes and butadiene are separated from each other and from unconverted normal butane by means of a combination of fractional distillation and extractive distillation with furfural. The normal butenes ordinarily are all blended together and catalytically dehydrogenated to butadiene, or in the practice of my invention the butene isomers are segregated one from the other and separately catalytically dehydrogenated, and the butadiene and butenes are separated from each other by fractional distillation and furfural absorption in an extractive distillation. In order to avoid confusion on the drawing reference numerals are not used, operation of the process being clear from the legends on the drawing and the accompanying description.

In Figure 4 fresh normal butane feed together with recycle normal butane is heated to dehydrogenation temperatures in one or more furnaces and passed through one or a plurality of catalyst cases containing a chromia-alumina dehydrogenation catalyst. After the dehydrogenation effluent passes through the usual quench tanks and coolers, it is compressed and enters an oil absorption unit, wherein light gases composed of hydrogen and hydrocarbons lighter than $C_4$ are rejected. $C_4$ and heavier hydrocarbons with traces of $C_3$ are stripped from absorption oil in a stripping unit which is part of the oil absorption unit shown on the drawing, and then passed to a fractional distillation column wherein an overhead composed of butene-1 and the limited amounts of butadiene made in the butane dehydrogenation is separated from normal butane and heavier. The latter material passes to a furfural absorption unit wherein an extractive distillation is carried out in the presence of a solvent composed of furfural plus a small amount of water, which solvent is introduced to the top of a fractional distillation column and removed from the bottom thereof. Extractive distillation in the furfural absorber unit rejects normal butane which is recycled for dehydrogenation and recovers the 2-butenes and heavier material dissolved in furfural. The rich furfural is stripped to recover the hydrocarbon material as an overhead. The process as described so far makes up what may be called step 1 and step 2 of a four-step process. Step 1 is the butane dehydrogenation and light gas separation, step 2 is the combination fractional distillation-extractive distillation for separation of butene dehydrogenation effluent, step 3 described below is the butene dehydrogenation plus light gas separation, and step 4 is the remaining product separation operation which recovers the butadiene product and separates the various butenes and other materials for recycle or discharge.

In accordance with a more customary procedure for producing butadiene, the 2-butenes recovered as furfural stripper overhead in step 2 and the 1-butene present in the butene-1 column overhead (which is separated from butadiene in step 4 and recovered in combination with undehydrogenated 1-butene which has passed through step 3) are combined with recycle 2-butenes from step 4, as shown by the dotted lines in Figure 4, and led to step 3 of the process, passing through furnaces for heating to dehydrogenating temperatures and through catalyst cases in parallel containing an iron oxide-chromia-potassia dehydrogenation catalyst. In the catalyst cases the butenes are dehydrogenated in admixture with steam diluent, and the effluent is passed through quench tanks and coolers, compressors and then to the oil absorption unit. Light gases are rejected and $C_3$ and heavier materials passed to a depropanizer column. Sent into this column also is the butene-1 stream overhead from the butene-1 column of step 2 which also contains some butadiene and small amounts of the $C_3$ hydrocarbons. Propane and propylene are rejected from the depropanizer column and the kettle product passes to a butene-2 column. A kettle product is there produced which is composed almost entirely of 2-butenes plus small amounts of polymer; this material is passed into a butene stripper de-oiler which is a simple fractional distillation column. The overhead from the butene-2 column composed of 1-butene, some 2-butenes plus the butadiene product is passed through a furfural absorption unit wherein a separation is made between undissolved 1-butene plus small amounts of isobutylene and normal butane on the one hand, and dissolved 2-butenes and butadiene on the other hand. The rich furfural is stripped and the hydrocarbon content thereof passed to the butadiene column wherein a separation is made between the lower boiling butadiene product which is recovered as an extremely pure fraction, and the higher boiling 2-butenes. The latter are passed to the butene stripper de-oiler. Polymeric materials higher boiling than 2-butenes are rejected in the de-oiler and the mixed 2-butenes are recovered overhead and passed to admixture with the 2-butenes recovered as furfural stripper overhead of step 2. The overhead stream of undissolved hydrocarbons from the furfural absorption unit of step 4, which stream is rich in 1-butene, is recovered for dehydrogenation and in the more conventional operation under discussion is blended with the mixed 2-butenes for common dehydrogenation as shown by dotted lines. A portion of this stream 1-butene is diverted and passed to a selective polymerization step wherein the isobutylene content thereof is selectively polmerized. This operation avoids a pyramiding in the system of isobutylene, which is formed in limited amounts by isomerization during the dehydrogenation operation. The unreacted $C_4$ content of the polymerization operation, composed of 1-butene and normal butane with small amounts of isobutylene, is recovered as an overhead from the polymer debutanizer and returned to the butene-1 column of step 2 for further segregation of components.

When the plant is operated as has just been described, three product streams in the fractionation area constitute the common feed stock for butene dehydrogenation: (1) furfural stripper overhead step 2 butene purification, (2) furfural absorber overhead step 4 butadiene purification, (3) de-oiler overhead step 4 butadiene purification. Typical analyses of these streams are given below for the operations shown.

|  | Step 2 furfural stripper overhead | Step 4 furfural absorber overhead | Step 4 de-oiler overhead |
|---|---|---|---|
| Gallons/hour | 4,450 | 8,450 | 4,000 |
| $iC_4H_{10}$ | [1] 2.0 | 8.3 | 0.0 |
| $iC_4H_8$ |  | 9.8 | 0.0 |
| 1-$C_4H_8$ | 1.4 | 42.8 | 0.0 |
| 1,3-$C_4H_6$ |  | 1.2 | 0.1 |
| $nC_4H_{10}$ | 0.6 | 21.6 | 20.1 |
| trans-2-$C_4H_8$ | 48.3 | 14.6 | 39.5 |
| cis-2-$C_4H_8$ | 47.7 | 1.7 | 39.3 |
| $C_5+$ |  |  | 1.0 |
|  | 100.0 | 100.0 | 100.0 |

[1] Other $C_4$'s.

In the operation described these three streams are blended and dehydrogenated together to form butadiene.

Attention is directed to the concentration of the three isomeric normal butenes in these product streams. The step 4 de-oiler overhead contains no 1-butene. The concentration of 1-butene in the step 2 stripper overhead is negligible. The concentration of cis-2-butene in the step 4 furfural absorber overhead is negligible while that of the trans-2-butene is small. The dehydrogenations and separations described which produce these streams are so modified in carrying out my invention as to allow separate dehydrogenation of the three butene isomers, as will now be described.

In accordance with my invention, the operation described above is carried out but with added steps which accomplish the object of the invention, viz. the production of larger per pass and ultimate yields of butadiene than obtainable from dehydrogenating mixed butenes. The step 4 furfural absorber overhead is rich in 1-butene and has a low content of 2-butenes. This material is maintained separate and passed to separate heating tubes and catalyst cases containing dehydrogenation catalyst. This 1-butene concentrate is thus dehydrogenated by itself and the effluent then joined with the other step 3 dehydrogenation effluents for quenching and separation. Both the step 2 furfural stripper overhead and the step 4 butene stripper de-oiler overhead are rich in the 2-butenes and practically free from 1-butene. While these mixed 2-butenes may remain mixed and undergo a common dehydrogenation separate from the dehydrogenation of the 1-butene stream, I prefer to blend the streams, which have a similar composition, and pass same to a precision fractional distillation column which I term a butene-2 splitter. In this column, by careful fractional distillation a separation is made between trans-2-butene on the one hand and cis-2-butene on the other hand. The resulting concentrates are then separately heated and dehydrogenated as shown, and the dehydrogenation effluents then blended with the effluent of the 1-butene dehydrogenation for common quenching and separation as described. By arranging the separation and dehydrogenation steps as shown, the high yield of butadiene from a given plant which has been described herein is readily accomplished.

In order to exemplify some of the benefits derivable from the practice of my invention, the following example is furnished, based on a unit of 1000 pounds of normal butane feed to a two-stage dehydrogenation process. It will be understood that these data are merely exemplary, and that the broad aspects of the invention are not limited to the exact conditions employed.

*Example*

One thousand pounds of n-butane is dehydrogenated over an $Al_2O_3$—$Cr_2O_3$—$MgO$ catalyst at 1100° F., 1 atmosphere pressure, and an hourly gas space velocity of 1000. The conversion is 30 per cent and the ultimate yield of butenes about 75 per cent. A per pass yield of 225 pounds of mixed butenes is obtained. Of this amount, 81.2 pounds is 1-butene, 57.6 pounds is cis-2-butene, and 86.2 pounds is trans-2-butene. A concentrate of each isomer is isolated by fractional distillation and extractive distillation and dehydrogenated individually over an $Fe_2O_3$—$Cr_2O_3$—$K_2O$ catalyst. Each concentrate is diluted with 10 volumes of steam per volume of hydrocarbon before dehydrogenation. The total pressure is 1 atmosphere and the hourly gas space velocity is 1200. The temperature for dehydrogenation of 1-butene and of cis-2-butene is 1200° F. That for the trans-2-butene is 1300° F. The conversion of 1-butene and of cis-2-butene is 40.8 per cent. That of trans-2-butene is 48.3 per cent. The ultimate yield of butadiene from 1-butene and from cis-2-butene is 80 per cent. That from trans-2-butene is 75 per cent. The total production of butadiene from the three individual dehydrogenations is 76.6 pounds. On the other hand, the total butadiene production by dehydrogenating the 225 pounds of mixed butenes at 1200° F. and with the same pressure, space velocity and catalyst is only 57.8 pounds. Thus the present invention makes possible a 32.5 per cent increase in butadiene production from 1000 pounds of n-butane.

I claim:

1. An improved method of obtaining increased yields of 1,3-butadiene from a mixture of isomeric normal butenes, which comprises separating said mixture into its components to form a trans-2-butene concentrate, a cis-2-butene concentrate, and a 1-butene concentrate, subjecting each of said concentrates to separate catalytic dehydrogenation to form butadiene, and recovering said butadiene in a quantity in excess of that producible by dehydrogenation of the said mixture of butenes at the same dehydrogenation conditions.

2. A method for the conversion of normal butenes to 1,3-butadiene which comprises separating from a mixture of normal butenes a first fraction containing more trans-2-butene than the total of the other normal butene isomers, a second fraction containing more cis-2-butene than the total of the other normal butene isomers, and a third fraction containing more 1-butene than the total of the other normal butene isomers, catalytically dehydrogenating said first fraction at 1150 to 1350° F. to form butadiene, separately catalytically dehydrogenating said second fraction at 1050 to 1250° F. to form butadiene, and separately catalytically dehydrogenating said third fraction at 1050 to 1250° F. to form butadiene, and recovering the butadiene so produced.

3. A method for recovering high yields of 1,3-butadiene from mixed normal butenes which comprises subjecting a mixed butenes fraction in admixture with portions of recycle butenes hereinafter described to a first separation step to form a trans-2-butene concentrate, a cis-2-butene concentrate, and a 1-butene concentrate, separately subjecting each of said concentrates to dehydrogenation in the presence of separate bodies of active dehydrogenation catalyst at dehydrogenation conditions forming butadiene, separately subjecting effluent of each of said butene dehydrogenations to separate separations to recover butadiene produced therein and to recover separate streams of unreacted butenes, recycling the bulk of each of said streams to the individual dehydrogenation step whence it came, and separating a minor portion of each of said stream and passing same to the aforesaid first separation step for segregation of butene isomers contained therein.

4. An improved method for the formation of butadiene from a mixture of the butene isomers which comprises separating such a mixture into at least two concentrates one being a concentrate of trans-2-butene containing more of same than the total of the other two butene isomers and the other of said at least two butene concentrates being a concentrate of at least one of the normal butenes other than trans-2-butene, contacting said one concentrate with a fresh dehydrogenation catalyst of maximum activity under dehydrogenation conditions of temperature, pressure and flow rate to form butadiene and continuing said contacting until the activity of the catalyst declines to a predetermined level lower than the initial activity, then stopping contact of such catalyst with said one concentrate and contacting same with said other concentrate at dehydrogenation conditions of temperature, pressure and flow rate to produce butadiene, and recovering butadiene produced by said dehydrogenations.

5. An improved method for converting normal butene isomers to butadiene which comprises employing an active dehydrogenation catalyst in a cyclic operation composed of at least three separate process steps, said process steps being in order: (a) contacting said catalyst while at its highest activity with trans-2-butene at dehydrogenation conditions to form butadiene from said trans-2-butene until the activity declines to a predetermined level, (b) contacting same with at least one of the isomers cis-2-butene and 1-butene at dehydrogenation conditions to form butadiene until the catalytic activity declines further to a predetermined lower level, (c) contacting same with a reactivation fluid under conditions increasing the activity of the catalyst to a level adequate to effect trans-2-butene dehydrogenation; repeating said process steps in series for a plurality of cycles, and recovering butadiene so produced in yields based on the total butene feed in excess of those obtainable by dehydrogenation under similar conditions of the butene isomers mixed.

6. An improved method for continuously converting normal butene isomers to butadiene which comprises employing at least four separate bodies of active dehydrogenation catalyst in a cyclic operation in which each of said bodies is employed in at least three separate process steps, said process steps being in order: (a) contacting the body of catalyst while at its highest activity with trans-2-butene at dehydrogenation conditions to form butadiene from said trans-2-butene until the activity declines to a predetermined level, (b) contacting same with at least one of the isomers cis-2-butene and 1-butene at dehydrogenation conditions to form butadiene until the catalytic activity declines further to a predetermined lower lever, (c) contacting same with a reactivation fluid under conditions increasing the activity of the catalyst to a level adequate to effect trans-2-butene dehydrogenation; repeating said process steps for each body of catalyst in series for a plurality of cycles, the cycles for each body of catalyst being so staggered that one body is always on stream for trans-2-butene dehydrogenation, another is always on stream for cis-2-butene dehydrogenation, another is always on stream for 1-butene dehydrogenation, and another is always undergoing reactivation and then awaiting dehydrogenation service after reactivation, and recovering butadiene so produced in yields based on the total butene feed in excess of those obtainable by dehydrogenation under similar conditions of the butene isomers mixed.

7. The method of claim 6 wherein a steam-active catalyst composed of a major proportion of iron oxide and minor proportions of chromia and alumina is employed for each said bodies of catalyst, each butene isomer is dehydrogenated in admixture with steam, and said reactivation treatment is at least one of treatment of the catalyst with steam and treatment of the catalyst with a potassium compound.

8. An improved method of obtaining high yields of 1,3-butadiene from a mixture of isomeric normal butenes, which comprises separating said mixture into its components to form a trans-2-butene concentrate, a cis-2-butene concentrate, and a 1-butene concentrate, subjecting said trans-2-butene concentrate to catalytic isomerization to form cis-2-butene, subjecting the isomerization effluent to a separation step to form a cis-2-butene fraction and a trans-2-butene fraction, recycling the latter to said isomerization, admixing said cis-2-butene fraction with the aforesaid cis-2-butene concentrate, subjecting the resulting admixture to catalytic dehydrogenation to form butadiene, separately subjecting the aforesaid 1-butene concentrate to catalytic dehydrogenation to form butadiene, recovering unreacted butenes from the cis-2-butene dehydrogenation effluent, recycling a portion of same to the dehydrogenation and passing another portion to the aforesaid separation step for segregation of butene isomers, and recovering butadiene produced in both said dehydrogenations.

9. A process for obtaining butadiene from a mixture of normal butenes which comprises fractionally distilling a C$_4$ and heavier material comprising normal butane, normal butenes and butadiene to produce an overhead product rich in 1-butene and containing some butadiene, subjecting the residue from fractional distillation to extractive distillation with furfural to reject normal butane undissolved, stripping absorbed material from the rich furfural to produce a first 2-butenes rich hydrocarbon stream, passing the aforesaid overhead containing 1-butene and butadiene to a fractional distillation zone in admixture with hydrocarbon effluent of a butene dehydrogenation operation described hereinbelow and depropanizing to separate C$_3$ and lighter hydrocarbons from admixture with C$_4$ and heavier hydrocarbons, fractionally distilling the C$_4$ and heavier hydrocarbons to produce an overhead fraction and a bottoms fraction which is rich in 2-butenes and heavier hydrocarbons, subjecting said overhead fraction to extractive distillation with furfural to produce as undissolved overhead a 1-butene rich stream hereinafter mentioned again, stripping the rich furfural to produce a 2-butenes and butadiene-rich stream, subjecting the last said stream to fractional distillation to recover pure butadiene product overhead, passing the kettle product of the last said fractional distillation in admixture with the aforesaid 2-butenes and heavier bottoms fraction to another fractional distillation and therein separating a 2-butenes rich stream free from hydrocarbons heavier than C$_4$, combining the last said stream and the aforesaid first 2-butenes rich stream and subjecting same to fractional distillation to segregate a trans-2-butene and a cis-2-butene concentrate, subjecting each of the last two concentrates and the 1-butene rich stream hereinbefore described to separate catalytic dehydrogenations in contact with separate bodies of dehydrogenation catalyst, combining the hot effluents from the trans-2-butene dehydrogenation, from the cis-2-butene dehydrogenation, and from the 1-butene dehydrogenation and subjecting same to cooling and separation of light gases, and passing the resulting C$_3$ and heavier materials as the aforesaid hydrocarbon effluent to the depropanizing fractional distillation mentioned hereinabove for recovery of recycle butenes and of butadiene product.

JAMES R. OWEN.

REFERENCES CITED

The following references are of record in the file of this patent:

UNITED STATES PATENTS

| Number | Name | Date |
|---|---|---|
| 2,362,218 | Schulze et al. | Nov. 7, 1944 |
| 2,412,911 | Scheeline | Dec. 17, 1946 |
| 2,415,921 | Wagner | Feb. 18, 1947 |